United States Patent Office 2,851,438
Patented Sept. 9, 1958

2,851,438

DIOLEFIN RUBBERS CONTAINING 1,4-DI-PRIMARY AMINO-TETRA-ALKYL BENZENES AS OZONE INHIBITORS

Harold Tucker, Akron, Ohio, assignor to The B. F. Goodrich Company, New York, N. Y., a corporation of New York No Drawing. Application April 6, 1955
Serial No. 499,763

19 Claims. (Cl. 260—45.9)

This invention relates to a class of chemicals for the protection of rubber under stress from deterioration in the presence of ozone and to vulcanized rubber compositions which have been so protected by that class of chemicals, which chemicals are not only excellent ozone inhibitors but are also non-staining and non-discoloring ozone inhibitors.

It has been demontrated in extensive experimentation that ozone does not have any marked deteriorating effect upon properly vulcanized rubber compositions when such compositions are not under stress, but that ozone does have a marked deteriorating effect on such rubber compositions when they are under stress. This deteriorating effect exhibits itself in the form of cracks in the surface of the stressed rubber, which cracks progress inwardly from the surface to a greater and greater depth and commonly are focal points for failure caused by fatigue of the rubber under stress.

Thus, in pneumatic tires in which the vulcanized rubber of the tread and sidewalls is under continuous stress, the ozone of the atmosphere first causes surface cracking, which cracks enlarge and progress downwardly to the fabric plies and permit moisture and air to rot and weaken the fabric and thus to cause a premature blowout of the pneumatic tire.

Many rubber products are subjected to stresses during use. In fact, any rubber product which undergoes stretching, bending, flexing, compression, etc. has at least the surface layers of the rubber, i. e., those in contact with atmospheric ozone, under stress and susceptible to ozone cracking. There is consequently a definite need, which has not as yet been satisfactorily met, for an effective ozone inhibitor in rubber formulations of products that are subjected to stresses.

In many of such rubber products, it is highly desirable that the ozone inhibitor be non-staining and non-discoloring. Thus, in the manufacture of white sidewall pneumatic tires, not only should the white sidewall rubber layer be protected by a non-staining and non-discoloring ozone inhibitor, but the underlying sidewall and carcass stocks should likewise be protected by a non-staining and non-discoloring ozone inhibitor. The latter becomes important because of the fact that the ozone inhibitor slowly and continuously migrates to the surface of the rubber composition containing it. In fact, the efficacy of any ozone inhibitor is dependent on this property of slow migration to the surface to provide on the surface a film of the ozone inhibitor.

Where a white surface layer of rubber is vulcanized to a body stock, the ozone inhibitor also migrates from the body stock into and through the surface layer and thus stains or discolors the white surface rubber layer of the white sidewall tire.

The ozone inhibitors of this application are not only effective ozone inhibitors but are also non-staining, non-discoloring ozone inhibitors. Insofar as applicant can ascertain, effective non-staining, non-discoloring ozone inhibitors have not heretofore been known in the rubber industry.

The problem of ozone deterioration of vulcanized rubber compositions when under stress has received much study over the years. The adverse action of ozone on rubber and rubber compositions under stress has been established by extensive experimentation to be different in kind and distinctly separate from the deteriorating effects on rubber of oxygen and sunlight, two major deteriorating agents in the atmosphere. These extensive tests give conclusive evidence that antioxidants for rubber and other hydrocarbons, such as oils, are ineffective as ozone inhibitors and show that the most effective amine and phenolic antioxidants are not effective ozone inhibitors. Conversely, experimentation has demonstrated that the ozone inhibitors of this application are not effective antioxidants in rubber and rubber compositions. There is a clear indication in these tests that the same chemical will not serve both as an effective antioxidant and an effective ozone inhibitor.

I have discovered that a class of 1,4-diamino-2,3,5-trimethyl-6-alkyl benzenes, wherein the alkyl group contains from 1 to 4 carbon atoms and each of the amino groups is a —$NH_2$ group, are superior non-staining non-discoloring ozone inhibitors for unsaturated rubbery polymers.

Without attempting to name all chemical compounds falling within the above indicated class, a few of those which are effective ozone inhibitors are:

1,4-diamino-2,3,5-trimethylbenzene
1,4-diamino-2,3,5-tributylbenzene
1,4-diamino-2,3,5,6-tetramethylbenzene
1,4-diamino-2,3,5,6-tetraethylbenzene
1,4-diamino-2,3,5,6-tetrapropylbenzene
1,4-diamino-2,3,5,6-tetrabutylbenzene
1,4-diamino-2,3,5-trimethyl-6-ethylbenzene The chemicals of the above indicated class, namely, 1,4-diamino-2,3,5-trimethyl-6-alkyl benzenes, in which the alkyl groups are attached to carbon atoms of the benzene nucleus, and no alkyl group is attached to the nitrogen of the amino groups, have been found to be effective non-staining, non-discoloring ozone inhibitors in unsaturated rubbery polymers, whether natural or synthetic.

It has been demonstrated that a somewhat migratory ozone inhibitor, namely, one that slowly blooms to the surface of the rubber and continuously provides a protective surface film of the ozone inhibitor to counteract the deteriorating effect of ozone at the surface of the rubber, is more effective.

My tests indicate that all the ozone inhibitors of this application have migratory rates adequate to impart effective protection against ozone deterioration, and that the migratory rates of the ozone inhibitors having at least one alkyl grouping with 2 to 4 carbon atoms are somewhat higher. The make-up of the recipe of the rubber composition also affects the rate of migration of the ozone inhibitor. Thus, a migratory wax in the recipe, such as carnauba, ceresin, montan, paraffin and similar synthetic waxes, assists in the migration of the ozone inhibitor to the surface of the rubber.

I have also found that where one of the R's of the above generic formula is an alkyl group having 2 or more carbon atoms, such as an ethyl group or a propyl group, and each of the remaining R's represents a methyl group, the resulting 1,4-diamino-2,3,5-trimethyl-6-alkylbenzene is an ozone inhibitor which has a somewhat higher rate of migration. For example, 1,4-diamino-2,3,5-trimethyl-6-ethylbenzene and 1,4-diamino-2,3,5-trimethyl-6-propylbenzene are excellent non-staining, non-discoloring ozone inhibitors for vulcanized rubber with a higher migration rate.

The term "rubbery diolefin polymer" is employed in this application in a broad generic sense to include all natural and synthetic unsaturated rubbery hydrocarbon polymers whether or not admixed with fillers, pigments, vulcanizing and/or accelerating agents and the like, examples of such rubbery diolefin polymers including the various natural rubbers, which are regarded as naturally-occurring isoprene polymers, and such synthetic rubbers as polymers of conjugated dienes, such as butadiene-1,3, isoprene, piperylene, and other butadiene-1,3 hydrocarbons, chloroprene, cyano butadiene-1,3, etc., as well as copolymers of these conjugated dienes with each other or with other unsaturated compounds copolymerizable therewith, such as styrene, chlorostyrene, isobutylene, acrylonitrile, methacrylonitrile, acrylic and methacrylic acids, alkyl acrylates and methacrylates, vinylidene chloride, vinyl pyridine, etc. The term "elastomer" is herein sometimes employed to designate any of the rubbery diolefin polymers hereinabove indicated.

The amount of the ozone inhibitor that may be effectively employed in elastomer compositions ranges from 0.5 to about 10 weight percent based on the elastomer, whereas to obtain maximum value of the ozone inhibitor, an amount ranging from about 0.5 to 5 weight percent will generally give adequate protection.

A number of methods for testing the efficacy of an ozone inhibitor in a vulcanized elastomer compound have been proposed but none has been generally accepted. In testing the efficacy of the ozone inhibitors of this application, three of these methods have been employed: (A) the Crabtree-Kemp accelerated exposure test made in an ozone aging cabinet in accordance with ASTM D1149–51T; (B) the tensioned rubber thread test made in an ozone aging cabinet; and (C) the differential creep in tensioned rubber thread test, made with The B. F. Goodrich Ozonometer, as described in the "Rubber World" for November 1954. Each of these methods is now more fully described.

TEST A

Test pieces are made by curing 6 x 6 x 0.080-inch pads for 30 minutes at 280° F. These cured test pieces are mounted in aluminum fixtures so as to give the test pieces a 20% elongation in accordance with ASTM D518–44. The mounted test pieces are placed in an ozone aging cabinet in which 25± parts ozone per hundred million parts of air are maintained at 100° F. All ratings are based on the time for appearance of the first cracks at 20 magnifications. It has been found that with a highly effective ozone inhibitor, such as the ozone inhibitors of this application, the time required for test results in the above method is so long as to make this method of test impractical for the evaluation of highly effective ozone inhibitors.

TEST B

A simpler and quicker method for evaluating the efficacy of an ozone inhibitor has consequently been developed. Vulcanized rubber threads are soaked in varying strengths of a benzene solution of the ozone inhibitor, and then the threads are hung in an ozone chamber with a weight suspended from the lower end of the thread to give to it an initial elongation of 20%. A number of threads may be tested simultaneously. During exposure of the tensioned threads, an ozone concentration in the ozone chamber is maintained constant, as for example, at 25± parts of ozone to a hundred million of air. Record is made of the increase in elongation of the thread with time, which is indicative of the ozone deterioration of the rubber.

TEST C

Creep under tension, i. e. elongation as a function of time, as in Test B, is a sensitive means of measuring the deteriorating effect of ozone on rubber. However, the elongation in Test B includes ordinary creep as well as creep due to ozone deterioration. The B. F. Goodrich Ozonometer measures both of these creeps simultaneously and records the difference between these values as a function of time, which is a measure of the deterioration of the rubber due to ozone. The Ozonometer comprises a low friction bearing pulley which maintains the stress equalized between the two legs of a single stretched rubber thread passing over the pulley. One leg is exposed to air and ozone, as by being positioned within an ozone aging chamber, while the other leg is encased in a chamber containing atmospheric air and protected from ozone. A differential creep between the two legs of the stretched rubber thread, always under conditions of equal but decreasing stress in the two legs of the rubber thread, causes the pulley to rotate. A pointer attached to the pulley indicates the number of angular degrees of such rotation, referred to as deflection. The deflection is plotted against time and the slope of the linear portion of this curve is referred to as the deflection rate. The time required to establish a linear deflection is designated the induction period. The lower the deflection rate and the longer the induction period, the higher the ozone inhibiting value of the ozone inhibitor being tested.

It has been indicated above that 1,4-diamino-2,3,5-trimethyl-6-ethylbenzene is an effective ozone inhibitor. It is here pointed out that the preparation of the ozone inhibitors forms no part of the invention of this application, since their preparation is described in the literature. A preferred method of preparing 1,4-diamino-2,3,5-trimethyl-6-ethylbenzene is to start with pseudocumene, which may be said to be 2,3,5-trimethylbenzene. The latter is acetylated with acetic anhydride and the ketone thus formed is reduced to form 2,3,5-trimethyl-6-ethylbenzene, which is nitrated to produce 1,4-dinitro-2,3,5-trimethyl-6-ethylbenzene, and then reduced to form the 1,4-diamino-2,3,5-trimethyl-6-ethylbenzene.

*Ozone inhibitor tests*

For the purpose of testing the efficiency of the 1,4-diamino-alkyl-substituted benzenes of this application, the following standard tire tread recipe is employed:

| Ingredients: | Parts by weight |
|---|---|
| Rubber GR–S | 100 |
| Carbon black (EPC) | 50 |
| Zinc oxide | 3 |
| Stearic acid | 2 |
| Sulfur | 2 |
| Accelerator [1] | 1 |
| Antioxidant [2] | 1 |
| Ozone inhibitor | As indicated |

[1] Benzothiazyl disulfide.
[2] Phenyl-beta-naphthylamine.

TEST A

Utilizing the Crabtree ozone chamber test described above on a vulcanized rubber of the above recipe, with 1,4-diamino-2,3,5-trimethyl-6-ethylbenzene as an ozone inhibitor, the following results were obtained:

| Parts of Ozone Inhibitor per 100 of Rubber | Results |
|---|---|
| Control—None | General cracking in 2 hours. |
| 3 | No cracking in over 168 hours. |
| 4 | No cracking in over 309 hours. |
| 5 | No cracking in over 168 hours. |

Obviously, the time factor is too great for practical testing with a highly effective ozone inhibitor, such as 1,4-diamino-2,3,5-trimethyl-6-ethylbenzene.

TEST B

Utilizing the more sensitive increased elongation test above described, with the concentration of the ozone inhibitor in benzene solution being 4 weight percent, and with an ozone concentration in the ozone aging chamber being maintained at approximately 15 parts of ozone to 100 million parts of air, the following results are obtained:

| Ozone Inhibitor | MM Creep At Time for 25 MM Creep for Control |
|---|---|
| Control—None | 25.0 |
| 1,4-diamino-2-3-5-trimethyl-6-ethylbenzene | 1.0 |

Since in this test, the less the creep or elongation in a given time, the more effective the ozone inhibitor, 1,4-diamino-2,3,5-trimethyl-6-ethylbenzene is shown to be a highly effective ozone inhibitor for vulcanized rubber.

TEST C

With the ozone aging chamber of the Ozonometer, above described, containing a controlled ozone content of 59 parts of ozone to 100 million parts of air, and utilizing the above test recipe having 3 parts of the ozone inhibitor to 100 parts of rubber, the following test results were obtained:

| Ozone Inhibitor | Induction Period, 1 min. | Deflection Rate |
|---|---|---|
| None | 1 | 1.22 |
| 1,4-diamino-2,3,5-trimethyl-6-ethylbenzene | 23 | 0.51 |

In this test, the longer the induction period and the lower the deflection rate, the more effective is the ozone inhibitor, hence the test shows 1,4-diamino-2,3,5-trimethyl-6-ethylbenzene to be highly effective as an ozone inhibitor.

Summarizing, the data obtained in each of the three above tests demonstrate conclusively that 1,4-diamino-2,3,5-trimethyl-6-ethylbenzene is a highly efficient ozone inhibitor for vulcanized rubber.

The other 1,4-diamino-alkyl-substituted benzenes hereinbefore enumerated also possess effective ozone inhibiting properties in vulcanized rubber products. Particularly effective are the 1,4-diamino-2,3,5,6-tetramethylbenzene and the 1,4-diamino-2,3,5-trimethyl-6-propylbenzene. When subjected to the Test B, in the same manner as described above, the following results were obtained:

| Ozone Inhibitor | MM Creep At Time for 25 MM Creep for Control |
|---|---|
| Control—No Ozone Inhibitor | 25.0 |
| 1,4-diamino-2,3,5,6-tetramethylbenzene | 5.4 |
| 1,4-diamino-2,3,5-trimethyl-6-propylbenzene | 1.0 |

The same ozone inhibitors, when tested in the Ozonometer (Test C) in the manner described above, give the following results:

| Ozone Inhibitor | Induction Period, 1 min. | Deflection Rate |
|---|---|---|
| Control—None | 1 | 1.22 |
| 1,4-diamino-2,3,5,6-tetramethylbenzene | 9 | 0.70 |
| 1,4-diamino-2,3,5-trimethyl-6-propylbenzene | 20 | 0.48 |

*Staining and discoloring tests*

The 1,4-diamino-alkyl-substituted benzenes of this application are in themselves non-staining and non-discoloring. A test of these non-staining, non-discoloring properties with respect to one of the ozone inhibitors of this application, as for example, 1,4-diamino-2,3,5,6-tetramethylbenzene, will serve to demonstrate these properties. The following white sidewall recipe is employed:

Ingredients:

| | Parts by weight |
|---|---|
| Natural rubber | 100.0 |
| Zinc oxide | 85.0 |
| Titanium dioxide | 15.0 |
| Ultramarine blue | 0.2 |
| Stearic acid | 1.0 |
| Sulfur | 3.0 |
| Accelerator—hepteen base | 0.3 |
| Antioxidant—AgeRite White [1] | 1.0 |
| Ozone inhibitor | As indicated |

[1] AgeRite White is sym. di-beta-naphthyl-para-phenylene-diamine.

For comparison, a composition of the above recipe without ozone inhibitor and a composition of the above recipe with 4 parts of ozone inhibitor were similarly compounded and given a like cure. Test pieces of the cured stocks were evaluated for discoloring by exposing to a standard RS sunlamp at a distance of 8 inches for 24 hours (ASTM procedure) to determine the discoloration of the rubber stock when exposed to light. Similar test pieces were evaluated for staining by placing them between white lacquered and white enameled refrigerator panels for 96 hours at 80° C. at a constant pressure of one pound per square inch.

| Ozone Inhibitor | Staining | Discoloring |
|---|---|---|
| Control—None | 0.4 | 0.80 |
| 4 parts per 100 of rubber | 0.4 | 0.75 |

The above test showed that white rubber stock containing the ozone inhibitor, 1,4-diamino-2,3,5,6-tetramethylbenzene, did not stain or discolor more than the same stock without the ozone inhibitor, and hence that the ozone inhibitor is a non-staining, non-discoloring ozone inhibitor.

Tests of the other above enumerated ozone inhibitors in vulcanized rubber compositions indicate that the 1,4-diamino-2,3,5-trimethyl-6-alkyl benzenes, where the alkyl substituents are attached to the carbon atoms of the benzene nucleus, are as a class effective non-staining, non-discoloring ozone inhibitors in vulcanized rubber products.

It is not the intention of the applicant to limit the invention of this application to the specific disclosure herein set forth, which has been presented as illustrative, since modifications in the proportions and types of materials employed may be varied and equivalent materials may be employed, where desirable, without departing from the spirit and scope of this invention as defined in the appended claims.

What is claimed is:

1. A vulcanized elastomer product possessing a superior resistance to ozone deterioration which comprises a rubbery diolefin polymer which has been vulcanized in the presence of a substantially non-staining, non-discoloring highly effective ozone inhibitor comprising a 1,4-diamino-2,3,5-trimethyl-6-alkyl benzene wherein the alkyl group is an alkyl hydrocarbon having from 1 to 4 carbon atoms and each of the amino groups is a —NH$_2$ group, the ozone inhibitor being intimately dispersed in the vulcanized rubber product in proportions ranging from about 0.5 to about 10 weight percent of the unsaturated rubbery polymer.

2. The vulcanized elastomer product defined in claim 1 in which the 1,4-diamino-alkyl-substituted benzene is a 1,4-diamino-2,3,5,6-tetraalkyl-substituted benzene.

3. The vulcanized elastomer product defined in claim 1 in which the 1,4-diamino-alkyl-substituted benzene is 1,4-diamino-2,3,5-trimethyl-6-alkyl-substituted benzene, with the 6-alkyl group containing two or more carbon atoms.

4. The vulcanized elastomer product defined in claim 1 in which the 1,4-diamino-alkyl-substituted benzene is 1,4-diamino-2,3,5-trimethyl-6-ethylbenzene.

5. The vulcanized elastomer product defined in claim 1 in which the 1,4-diamino-alkyl-substituted benzene is 1,4-diamino-2,3,5-trimethyl-6-propylbenzene.

6. The vulcanized elastomer product defined in claim 1 in which the 1,4-diamino-alkyl-substituted benzene is 1,4-diamino-2,3,5-trimethyl-6-butylbenzene.

7. The vulcanized elastomer product defined in claim 1 in which the 1,4-diamino-alkyl-substituted benzene is 1,4-diamino-2,3,5,6-tetramethylbenzene.

8. A vulcanized elastomer product characterized by a high resistance to ozone deterioration and comprising a rubbery diolefin polymer, in which has been incorporated prior to vulcanization a substantially non-staining, non-discoloring ozone inhibitor consisting essentially of a 1,4-diamino-2,3,5,6-tetra-alkyl benzene in which each of the alkyl groups contains from 1 to 4 carbon atoms and is attached to a carbon atom of the benzene ring, the ozone inhibitor being present in proportions ranging from 0.5 to 10 weight percent of the said rubbery diolefin polymer.

9. The vulcanized product defined in claim 8 in which the 1,4-diamino-2,3,5,6-tetra-alkyl benzene has at least one alkyl group containing from 2 to 4 carbon atoms.

10. The vulcanized product defined in claim 8 in which at least one alkyl group of the 1,4-diamino-2,3,5,6-tetra-alkyl benzene is an ethyl group.

11. A vulcanized natural rubber product characterized by a high resistance to ozone deterioration and comprising natural rubber in which has been incorporated prior to vulcanization a substantially non-staining, non-discoloring ozone inhibitor consisting essentially of a 1,4-diamino-2,3,5,6-tetra-alkyl benzene in which each of the alkyl groups contains from 1 to 4 carbon atoms and is attached to a carbon atom of the benzene ring, the ozone inhibitor being present in proportions ranging from 0.5 to 10 weight percent of the said natural rubber.

12. The vulcanized rubber product defined in claim 11 in which the 1,4-diamino-2,3,5,6-tetra-alkyl benzene has at least one alkyl group containing from 2 to 4 carbon atoms.

13. The vulcanized rubber product defined in claim 11 in which at least one alkyl group of the 1,4-diamino-2,3,5,6-tetra-alkyl benzene is an ethyl group.

14. The method of producing a vulcanized elastomer product characterized by a high resistance to ozone deterioration which comprises vulcanizing a rubbery diolefin polymer containing from about 0.5 to about 10 weight percent on the said polymer of a non-staining, non-discoloring ozone inhibitor comprising a 1,4-diamino-2,3,5-trimethyl-6-alkyl benzene, wherein the alkyl group has from 1 to 4 carbon atoms and each amino group is a —NH$_2$ group, the said ozone inhibitor being present in the vulcanized elastomer product to resist ozone deterioration.

15. The method of producing a vulcanized elastomer product as defined in claim 10 in which the 1,4-diamino-alkyl-substituted benzene is 1,4-diamino-2,3,5-trimethyl-6-alkyl-substituted benzene, with the 6-alkyl group containing two or more carbon atoms.

16. The method of producing a vulcanized elastomer product as defined in claim 10 in which the 1,4-diamino-alkyl-substituted benzene is 1,4-diamino-2,3,5-trimethyl-6-ethylbenzene.

17. The method of producing a vulcanized elastomer product as defined in claim 10 in which the 1,4-diamino-alkyl-substituted benzene is 1,4-diamino-2,3,5-trimethyl-6-propylbenzene.

18. The method of producing a vulcanized elastomer product as defined in claim 10 in which the 1,4-diamino-alkyl-substituted benzene is 1,4-diamino-2,3,5-trimethyl-6-butylbenzene.

19. The method of producing a vulcanized elastomer product as defined in claim 10 in which the 1,4-diamino-alkyl-substituted benzene is 1,4-diamino-2,3,5,6-tetramethylbenzene.

References Cited in the file of this patent

UNITED STATES PATENTS

| | | |
|---|---|---|
| 1,971,329 | Calcott et al. | Aug. 28, 1934 |
| 2,189,736 | Lauter | Feb. 6, 1940 |
| 2,657,982 | Hill et al. | Nov. 3, 1953 |
| 2,681,271 | Cowie | June 15, 1954 |

OTHER REFERENCES

"Rubber World," August 1954, pages 636–642.

UNITED STATES PATENT OFFICE
CERTIFICATE OF CORRECTION

Patent No. 2,851,438

September 9, 1958

Harold Tucker

It is hereby certified that error appears in the printed specification of the above numbered patent requiring correction and that the said Letters Patent should read as corrected below.

Column 8, lines 13, 18, 22, 26, and 30, for the claim reference numeral "10", each occurrence, read -- 14 --.

Signed and sealed this 24th day of March 1959.

(SEAL)
Attest:

KARL H. AXLINE
Attesting Officer

ROBERT C. WATSON
Commissioner of Patents